(12) United States Patent
Holz (10) Patent No.: US 11,040,585 B2
(45) Date of Patent: Jun. 22, 2021

(54) TRAILER COUPLING (71) Applicant: ACPS Automotive GmbH, Markgroeningen (DE)

(72) Inventor: Christian Holz, Walddorfhaeslach (DE)

(73) Assignee: ACPS Automotive GmbH, Markgroeningen (DE)

( * ) Notice: Subject to any disclaimer, the term of this patent is extended or adjusted under 35 U.S.C. 154(b) by 226 days.

(21) Appl. No.: 16/259,529

(22) Filed: Jan. 28, 2019

(65) Prior Publication Data

US 2019/0232739 A1 Aug. 1, 2019

(30) Foreign Application Priority Data

Jan. 29, 2018 (DE) ...................... 10 2018 101 887.8

(51) Int. Cl.
| | |
|---|---|
| *B60D 1/06* | (2006.01) |
| *B60D 1/48* | (2006.01) |
| *B60D 1/52* | (2006.01) |
| *B60D 1/62* | (2006.01) |
| *B60D 1/24* | (2006.01) |
| *B60D 1/54* | (2006.01) |

(52) U.S. Cl.
CPC ............. *B60D 1/065* (2013.01); *B60D 1/06* (2013.01); *B60D 1/246* (2013.01); *B60D 1/485* (2013.01); *B60D 1/52* (2013.01); *B60D 1/54* (2013.01); *B60D 1/62* (2013.01); *B60D 2001/542* (2013.01)

(58) Field of Classification Search
CPC .... B60D 1/06; B60D 1/485; B60D 2001/544; B60D 1/246; B60D 1/065; B60D 1/52; B60D 1/54; B60D 1/62

USPC ...................................... 280/491.3, 495, 497
See application file for complete search history.

(56) References Cited

U.S. PATENT DOCUMENTS

| | | |
|---|---|---|
| 6,079,728 A | 6/2000 | Miller |
| 6,203,078 B1 | 3/2001 | Karrer |
| 2002/0113408 A1 | 8/2002 | Braun et al. |

FOREIGN PATENT DOCUMENTS

| | | |
|---|---|---|
| DE | 10061491 C1 | 4/2002 |
| DE | 60302834 | 8/2006 |
| DE | 102008039807 A1 | 9/2009 |
| EP | 0012600 A1 | 6/1980 |
| EP | 1 142 732 | 10/2001 |
| EP | 1 380 444 | 1/2004 |
| EP | 1 741 572 | 1/2007 |

(Continued)

*Primary Examiner* — Jacob B Meyer
*Assistant Examiner* — Sophia Marie McGuire
(74) *Attorney, Agent, or Firm* — Reinhart Boerner Van Deuren P.C.

(57) ABSTRACT

A trailer coupling comprises a cross member unit, which is mountable on a tail region of a body, and a bearing unit held by the cross member unit. A ball neck with a coupling ball is held on the cross member unit by the bearing unit. The cross member unit is connected in its two outer, mutually opposed end regions to mounting elements for fixation to the tail region. The cross member unit has an upper supporting structure and a lower supporting structure. The supporting structures are each connected at their mutually opposed outer end regions to the mounting elements and in a central region carry the bearing unit. One of the supporting structures is primarily torsionally rigid and at least partially surrounds a structure interior, and that the other of the supporting structures is primarily tensile stiff in the direction of travel.

21 Claims, 5 Drawing Sheets

(56) References Cited

FOREIGN PATENT DOCUMENTS

| EP | 1 886 847 | 2/2008 |
|----|-----------|--------|
| EP | 1995550 A2 | 11/2008 |
| EP | 2 141 034 | 1/2010 |
| EP | 2 261 066 | 12/2010 |
| EP | 2316670 A1 | 5/2011 |
| EP | 2 567 837 | 3/2013 |
| WO | WO 2006/065117 | 6/2006 |

TRAILER COUPLING

CROSS-REFERENCE TO RELATED PATENT APPLICATIONS

This patent application claims the benefit of German Application No. 10 2018 101 887.8 filed Jan. 29, 2018, the entire teachings and disclosure of which are incorporated herein by reference thereto.

The invention relates to a trailer coupling comprising a cross member unit, which is mountable on a tail region of a vehicle body, in particular a vehicle body of a passenger vehicle, and which extends transverse to a longitudinal direction of the vehicle body, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region.

Trailer couplings of this type are known from the prior art.

In these trailer couplings a cross member tube is usually used as cross member unit, on which the bearing unit is held.

In order to take up the necessary forces, a cross member tube of this kind must be formed solidly and therefore has a large mass.

In order to save energy there is thus a need to improve a cross member unit of this kind in such a way that the mass thereof is lower, whilst stability remains unaffected.

This object is solved according to the invention by a trailer coupling of the type described in the introduction in that the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel.

The advantage of the solution according to the invention can be considered that, as a result of the division of the supporting structures into a primarily torsionally rigid supporting structure and another supporting structure that is primarily tensile stiff in the direction of travel, it has been made possible to reduce the weight of the cross member unit as a whole without encountering disadvantages in respect of the overall stability of the cross member unit.

Here, both the primarily torsionally rigid supporting structure and the supporting structure that is primarily tensile stiff in the direction of travel are additionally also used to take up forces acting on the trailer coupling in the vertical direction and in a horizontal transverse direction, and in addition the primarily torsionally rigid supporting structure also takes up forces acting in the direction of travel, and similarly the supporting structure that is primarily tensile stiff in the direction of travel takes up torsional forces, albeit to a reduced extent as compared to the other supporting structure respectively.

It is also preferably provided that a spacing of the supporting structures between the outer end regions thereof is minimal and between the central regions is maximal.

A particularly favourable solution provides that the central region of the upper supporting structure is higher in the vertical direction than the outer end regions of said supporting structure.

For reasons of load take-up it is also favourable if the upper supporting structure runs approximately arcuately between the outer end regions thereof.

In order to support the forces acting on the upper supporting structure in the vertical direction it is additionally favourable if the upper supporting structure, starting from the outer end regions thereof, runs substantially elongated in the direction of the central region.

No specific details have yet been provided in respect of the lower supporting structure.

It is favourable if a central region of the lower supporting structure in the vertical direction is lower than the outer end regions thereof.

A favourable embodiment of the lower supporting structure provides that said structure runs approximately arcuately between the outer end regions.

In order to take up the forces acting in the vertical direction it has also proven to be favourable if the lower supporting structure, starting from the outer end regions, runs elongated in the direction of the central region.

With regard to the design of the torsionally rigid supporting structure, no further details have been provided in conjunction with the previous explanation of the individual embodiments.

One advantageous solution provides that the torsionally rigid supporting structure is tubular at least in sections.

It is particularly favourable if the torsionally rigid supporting structure is tubular over its entire length, in particular from one outer end region to the other outer end region.

No further details have yet been provided in respect of the design of the tensile stiff supporting structure.

It is particularly favourable if the tensile stiff supporting structure is formed as a planar supporting structure which runs transverse to the vertical direction.

It is also preferably provided that the tensile stiff supporting structure at the outer end regions has a greater areal extent in a horizontal longitudinal direction than in the central region.

In particular it is provided that the tensile stiff supporting structure, starting from the outer end regions and extending increasingly in the direction of the central region, has a decreasing extent in the horizontal longitudinal direction.

In particular, one advantageous solution provides that the tensile stiff supporting structure has the maximum extent in the direction parallel to the horizontal longitudinal direction in the region of a connection to the mounting elements.

No further specification has yet been provided in respect of the plane in which the tensile stiff supporting structure extends.

One advantageous solution provides that the tensile stiff supporting structure extends in a plane running approximately parallel to the horizontal longitudinal direction.

An approximately parallel course of this plane is understood here to mean that the plane encloses an angle of at most ±40°, preferably at most ±30°, and, better still, at most ±20° with the horizontal direction.

No further details regarding the construction of the tensile stiff supporting structure have been specified in conjunction with the explanation of said supporting structure.

It is preferably provided that the tensile stiff supporting structure has two structure arms running between the end regions and the central region, which arms are connected to one another at least in the central region.

The structure arms are also preferably connected to one another at the end regions of the tensile stiff supporting structure.

A particularly advantageous embodiment of the structure arms provides that these are formed as flat struts lying in the plane running approximately parallel to the horizontal longitudinal direction, in particular as front flat struts and rear flat struts as considered in the direction of travel.

With regard to the design of the upper supporting structure and the lower supporting structure, there has not yet been any further specification as to which of them should be the primarily torsionally rigid supporting structure and which should be the primarily tensile stiff supporting structure.

In accordance with an advantageous solution the upper supporting structure is the primarily torsionally rigid supporting structure and the lower supporting structure is the primarily tensile stiff supporting structure.

Alternatively, however, the reverse arrangement also can be provided.

No further details have yet been provided in respect of the fixing of the bearing unit to the individual supporting structures.

One advantageous solution provides that the bearing unit is connected both to the upper supporting structure and to the lower supporting structure.

It is particularly favourable, if the bearing unit is arranged between the supporting structures, that a particularly space-saving solution is provided.

In principle, the bearing unit could be connected directly to the supporting structures.

A particularly advantageous solution, however, provides that the bearing unit is held on a mounting unit connected to the supporting structures, such that the bearing unit thus can be replaced, whereas the mounting unit is preferably fixedly connected to the supporting structures, in particular is welded or soldered thereto.

It is particularly favourable if the mounting unit extends between the tensile stiff supporting structure and the torsionally rigid supporting structure and is fixedly connected to the central regions of both the tensile stiff supporting structure and the torsionally rigid supporting structure, and therefore a very compact design of the cross member unit is likewise provided.

Further features and advantages of the solution according to the invention are the subject of the following description and the illustration in the drawings of an exemplary embodiment.

Figure 1:
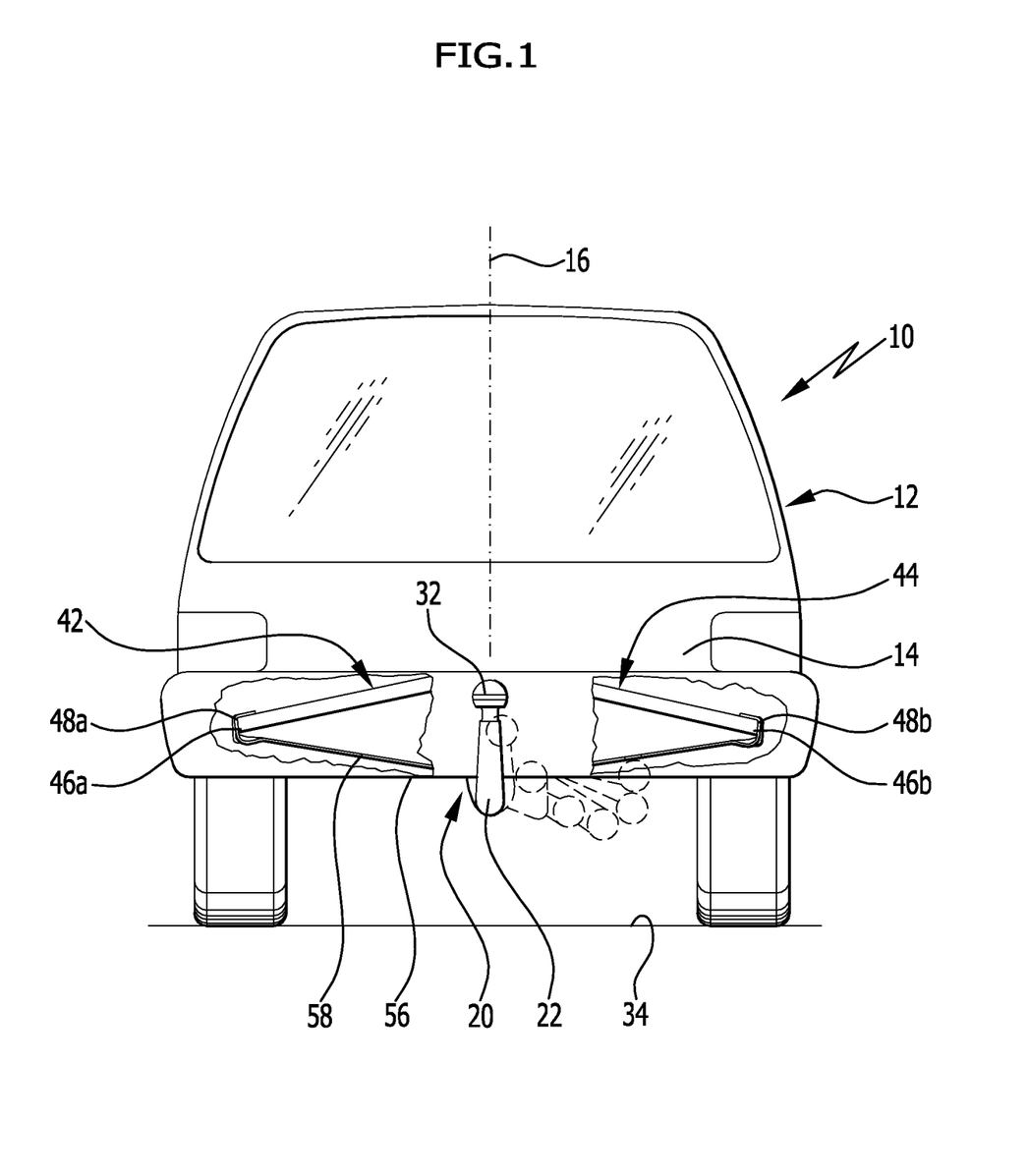
FIG. 1 an illustration of a motor vehicle, in particular a passenger vehicle, as viewed in the direction of travel from behind with the trailer coupling according to the invention, wherein a bumper unit of the motor vehicle is shown partially broken open.

A passenger vehicle shown in FIG. 1 and denoted as a whole by 10 comprises a vehicle body 12, which carries a trailer coupling 20 at a tail region 14, which trailer coupling, as shown in FIGS. 1 to 4, has a ball neck 22, which extends from a first end region 24 nearer to the vehicle to a second end region 26 further away from the vehicle, wherein a ball attachment piece 28 is arranged on the second end region 26, with a coupling ball 32 sitting on said ball attachment piece, which coupling ball is thus connected via the ball attachment piece 28 to the second end region 26 of the ball neck 22.

The first end region 24 of the ball neck 22 is connected via a bearing unit denoted as a whole by 40 to a vehicle-side mounting unit 42, which is connected by means of a cross member unit 44 to the tail region 14 of the vehicle body 12.

For example, the cross member unit 44 extends transversely to a longitudinal median plane 16 of the vehicle body 12, said plane being vertical to a roadway 34, and at its end regions 46a, 46b is connected to the tail region 14 by means of mounting elements 48a, 48b, for example side members 48a, 48b running on both sides of the longitudinal median plane 16 and parallel thereto, wherein the mounting elements 48a, 48b are connected at one end to the end regions 46a, 46b and at the other end to body portions 52a, 52b of the tail region 14.

In particular, the bearing unit 40 in the simplest case is formed such that it produces a rigid connection between the first end region 24 of the ball neck 22 and the mounting unit 42.

Figure 2:
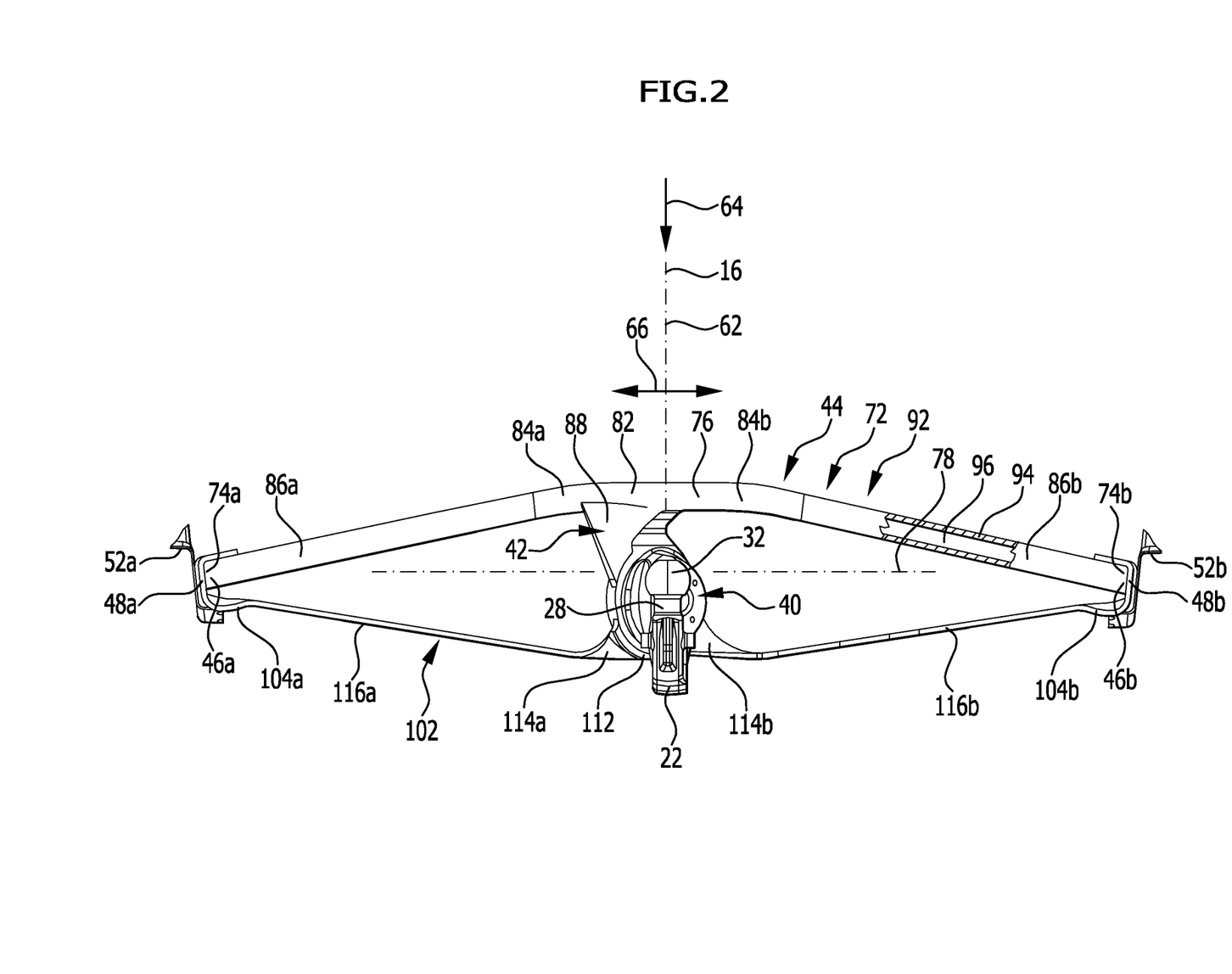
FIG. 2 shows an enlarged view similar to FIG. 1 of the trailer coupling according to the invention as viewed in the direction of travel.

In the exemplary embodiment shown in FIGS. 1 and 2, the bearing unit 40 enables a pivoting of the ball neck 22 about a pivot axis 54 arranged fixedly relative to the vehicle, but running obliquely, in particular at an acute angle, relative to the vertical longitudinal median plane 16, such that, as shown in FIG. 1, the ball neck 22 can be moved under a lower edge 56 of a rear-end bumper unit 58 and can be positioned in a gap between the bumper unit 58 and the tail region 14 of the body 12 in a rest position, whereas in the working position shown in FIG. 1 the ball neck 22 extends substantially parallel to the longitudinal median plane 16, but at the least runs such that, in the working position, a vertical median axis of the coupling ball 32 at the same time constitutes a median axis of the ball attachment piece 28 and this median axis 62 lies in the vertical longitudinal median plane 16 of the body 12.

Bearing units 40 of this kind together with the associated locking devices are described in detail for example in European patent applications EP 1 142 732 A, EP 1 741 572 A, EP 1 886 847 A, EP 2 141 034 A, EP 2 261 066 A and EP 2 567 837 A, and reference is made to the full disclosure of these patent applications.

The cross member unit 44 comprises an upper supporting structure 72 as considered in the vertical direction 64, which upper supporting structure extends between outer end regions 74a and 74b thereof, wherein the outer end regions 74a and 74b of the upper supporting structure 72 lie in the end regions 46a and 46b of the cross member unit and in particular are arranged symmetrically to the longitudinal median plane 16.

A central region 76, which likewise is formed symmetrically to the longitudinal median plane 16 for example, lies between the outer end regions 74a and 74b of the upper supporting structure 72.

The upper supporting structure 72 is preferably shaped in such a way that the central region 76, based on the vertical direction 64, is higher than a connection plane 78 intersecting each of the end regions 74a and 74b at the same height, wherein the central region 76 forms a supporting portion 82 holding the mounting unit 42, which supporting portion transitions by means of bends 84a and 84b in support portions 86a and 86b of the upper supporting structure, wherein the support portions 86a and 86b extend as far as the outer end regions 74a and 74b.

The supporting portion 82 is preferably connected to an upper part 88 of the mounting unit 42, such that the mounting unit 42 extends downwardly in the vertical direction starting from the supporting portion 82.

The upper supporting structure 72 is preferably formed as a one-part tubular body 92, which extends as a one-piece part between the outer end regions 74a and 74b and in so doing forms both the support portions 86a and 86b and the bends 84a and 84b and the supporting portion 82.

The tubular body 92 comprises a tubular wall 94, which surrounds an interior 96 of the tubular body 92.

The tubular body 92 also lies in a plane running parallel to the vertical direction 64, which plane is formed in particular symmetrically with respect to the longitudinal median plane 16 and in the simplest case runs perpendicularly to the longitudinal median plane 16, but as appropriate can have bends or curves running from the longitudinal median plane 16 either in the direction of travel of the motor vehicle or opposite the direction of travel of the motor vehicle.

The upper supporting structure 72 is thus formed in particular such that it can take up both forces acting in the vertical direction 64 and forces acting in a horizontal transverse direction 66 running perpendicularly to the vertical longitudinal median plane 16, and also can take up forces running in a horizontal longitudinal direction 68 running parallel to the vertical longitudinal median plane 16 and perpendicularly to the vertical direction 64.

In addition, the forming of the upper supporting structure 72 as a tubular body 92 also makes it possible to take up torsional forces 98, which have a tendency to rotate the central region 76 of the upper supporting structure 72 relative to the end regions 74a, 74b.

In addition, the cross member unit 44 comprises a lower supporting structure 102 running beneath the upper supporting structure 72 in the vertical direction 64, which lower supporting structure extends likewise between outer end regions 104a and 104b and has a central region 106 that is lower in the vertical direction 64 relative to the end regions 104a, 104b, and in particular is also arranged beneath the connection plane 78 in the vertical direction and comprises a holding portion 112 lying in the central region 106, which holding portion is formed for example as part of the mounting unit 42.

Bend portions 114a and 114b run, starting from the holding portion 112, to stabilisation portions 116a and 116b of the lower supporting structure extending to the outer end regions 104a and 104b, wherein in particular the stabilisation portions 116a and 116b are planar and extend in a plane of extent which runs in a substantially planar manner parallel to the horizontal longitudinal direction 68.

Here, a course of the plane of extent substantially parallel to the horizontal longitudinal direction 68 is understood to mean a course that can enclose an angle of at most ±30°, preferably an angle of at most ±20°, with the horizontal longitudinal direction 68.

The extent of the stabilisation portions 116a, 116b in the direction parallel to the horizontal longitudinal direction 68 in the region of the outer end regions 104a, 104b is preferably greater than at the transition to the bending portions 114a, 114b, and the extent of the stabilisation portions 116a, 116b at the outer end regions 104a, 104b of the lower supporting structure 102 is maximal and at the transition to the bending portions 114a, 114b is minimal.

The stabilisation portions 116a, 116b are preferably formed from a flat material, which in the plane of extent has an approximately triangular course, wherein this flat material, by means of central recesses 122a, 122b in the respective stabilisation portions 116a, 116b, divides the stabilisation portions 116a, 116b in each case into a flat strut 124a, 124b arranged to the front in the direction of travel and a rear flat strut 126a, 126b, opposite the direction of travel, which struts both lie in the plane of extent and extend in the direction of the central region 106 starting from the outer end regions 104a, 104b of the lower supporting structure 102 and transition into one another at the latest upon reaching the central region 106.

In possible embodiments of the solution according to the invention, in order to form the end regions 46a, 46b of the cross member unit 44 connected to the mounting elements 48a, 48b, either the outer end regions 74a, 74b of the upper supporting structure 72 are fixedly connected, that is to say welded for example, to the outer end regions 104a, 104b of the lower supporting structure 102, or the outer end regions 74a, 74b of the upper supporting structure 72 and the outer end regions 104a, 104b of the lower supporting structure 102 are fixedly connected to the mounting elements 48a and 48b.

Figure 3:
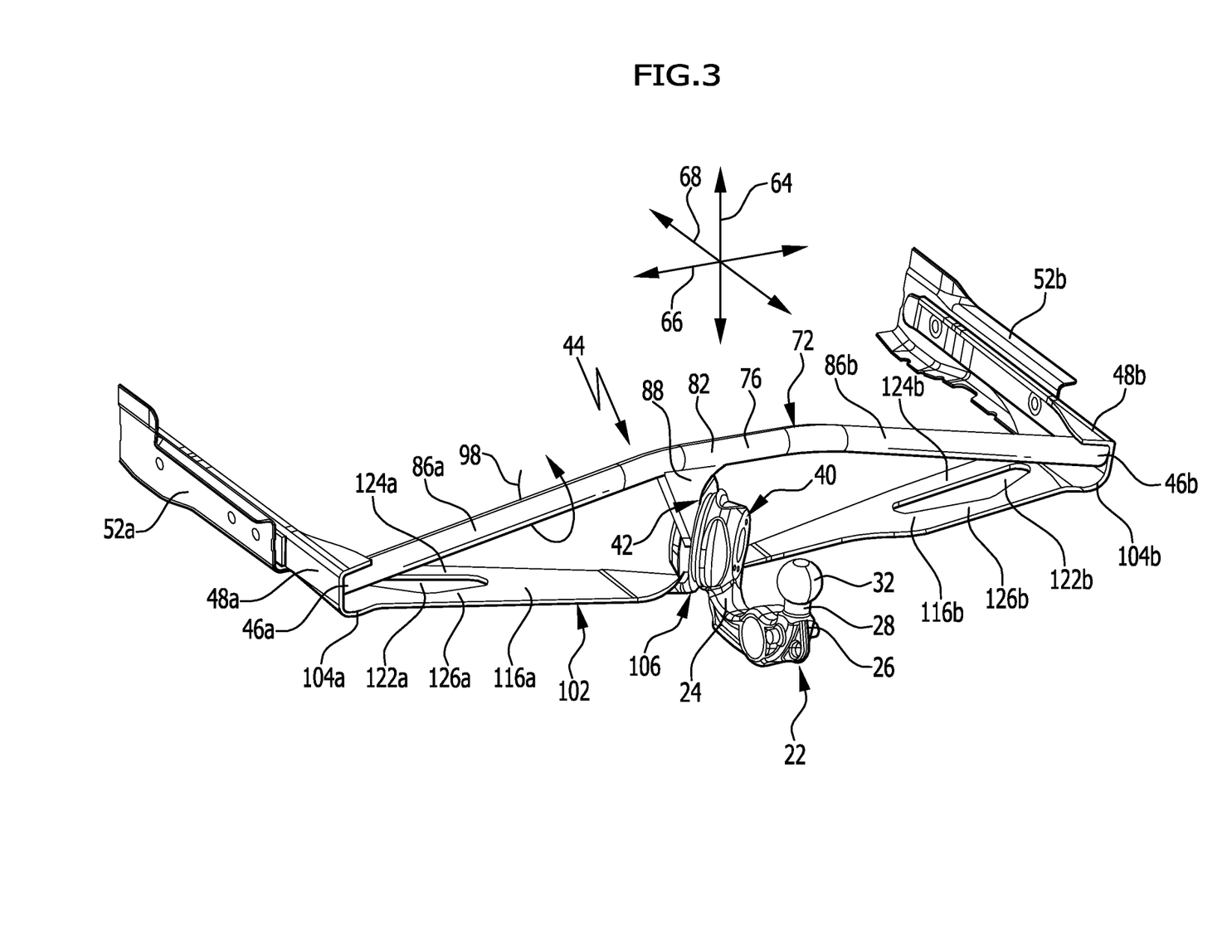
FIG. 3 shows a perspective illustration of the trailer coupling according to the invention as viewed in the direction of travel from the top left.
Figure 4:
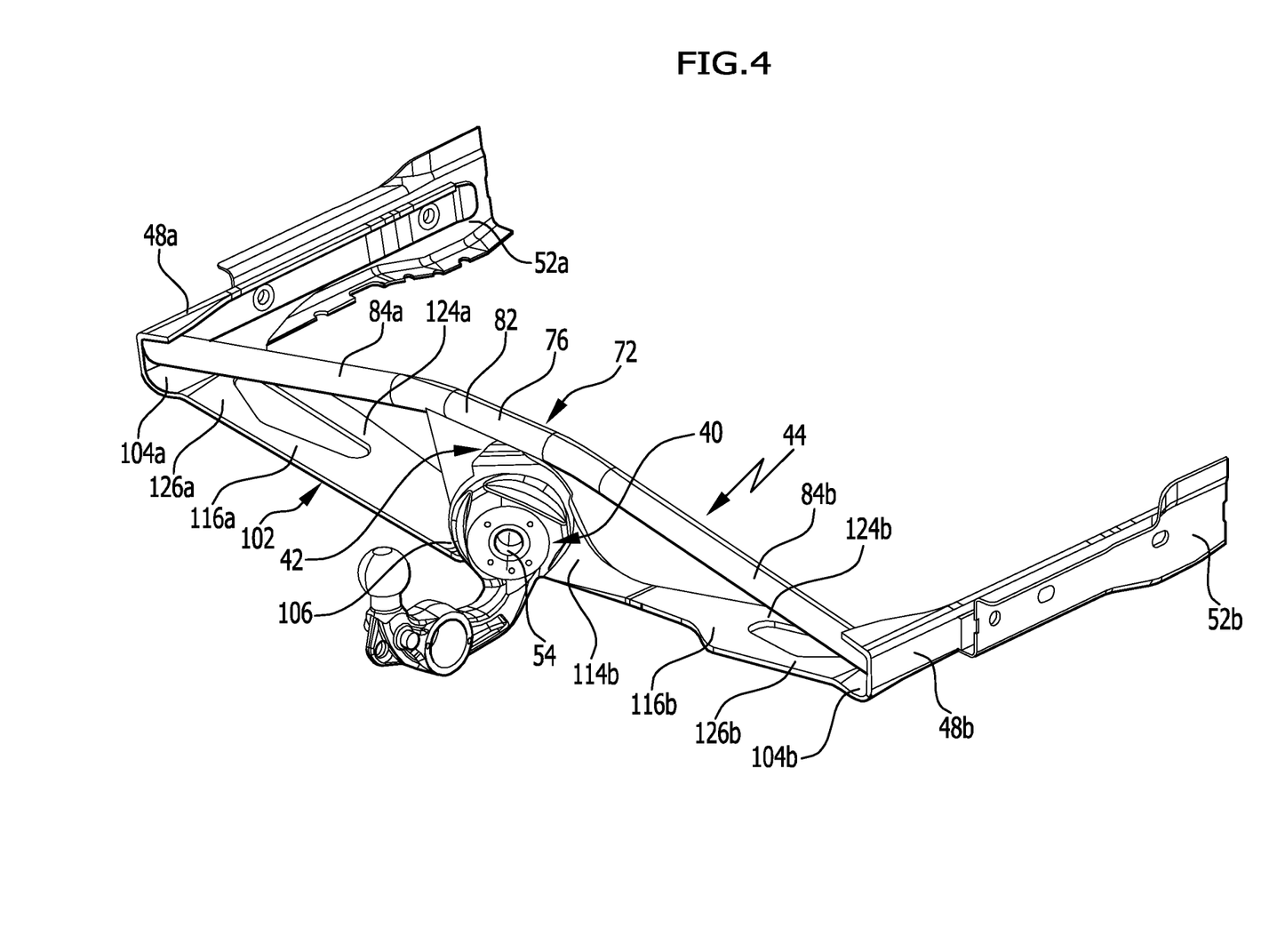
FIG. 4 shows a perspective illustration of the trailer coupling according to the invention as viewed in the direction of travel from the top right.

In the advantageous embodiments of the solution according to the invention shown in FIGS. 2 to 4, the mounting elements 48a, 48b are for example formed as side members extending parallel to the direction of travel and connected to the body portions 52a, 52b, which side members are formed in turn by a flat material curved in a U-shape in cross-section at least in part, wherein the stabilisation portions 116a, 116b made of flat material are moulded in one piece on these side members made of flat material, and also the bending portions 114a, 114b are moulded in one piece on the flat material of the stabilisation portions 116a, 116b.

In this case there is merely a need to fixedly connect the outer end regions 74a and 74b of the upper supporting structure 72 to the outer end regions 104a, 104b of the lower supporting structure 102, such that a connection to the side members 48a and 48b and also to the lower supporting structure 102 is thus established.

Figure 5:
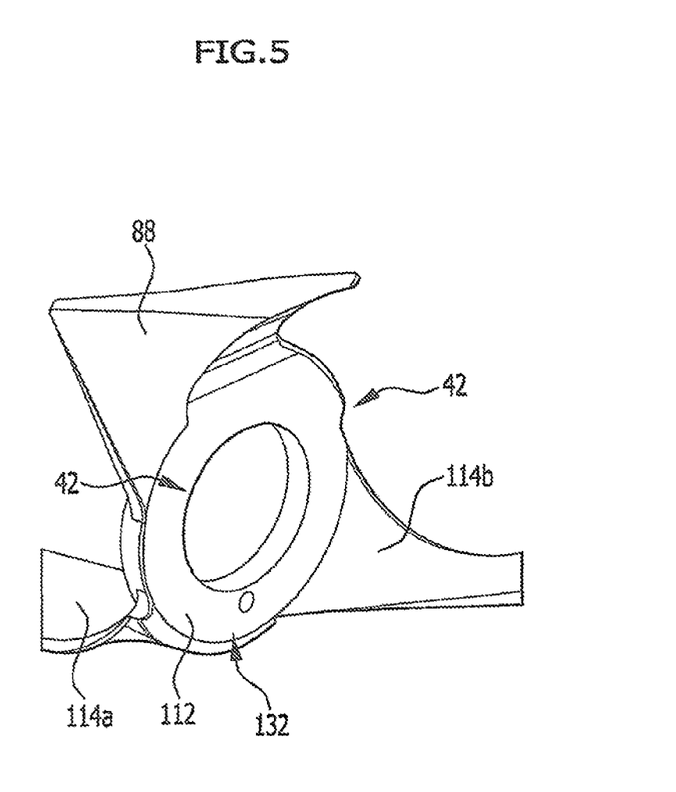
FIG. 5 shows an enlarged illustration of a mounting unit of the trailer coupling according to the invention.

As shown in FIG. 5, the bending portions 114a and 114b of the lower supporting structure 102 are connected to the holding portion 112, which is formed by a lower region of the mounting unit 42.

The mounting unit 42 is preferably formed by an annular body 132, on which the bearing unit denoted as a whole by 40 is mounted, with the upper part 88 of said mounting unit being integrally formed on said annular body 132, the upper part being fixedly connected to the supporting portion 82 of the upper supporting structure 72, and a lower region of the annular body 132 additionally forming the holding portion 112.

As a result of the design of the annular body 132, it is possible to form the bending portions 114a, 114b such that these are fixedly connected, for example welded, to the annular body 132.

On the whole, the mounting unit 42 thus lies between the central region 76 of the upper supporting structure 72 and the central region 106 of the lower supporting structure 102, and therefore the support portions 86a, 86b and the stabilisation portions 116a, 116b run approximately along longitudinal sides of a diamond lying between the mounting elements 48a, 48b and thus support the mounting unit 42 relative to the mounting elements 48a, 48b in a stable manner.

The invention claimed is:

1. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the central region of the upper supporting structure is higher in the vertical direction than the outer end regions of said supporting structure.

2. A trailer coupling according to claim 1, wherein a spacing of the supporting structure between the outer end regions thereof is minimal and between the central regions is maximal.

3. A trailer coupling according to claim 1, wherein the upper supporting structure, starting from the end regions thereof, runs substantially elongated in the direction of its central region.

4. A trailer coupling according to claim 1, wherein a central region of the lower supporting structure lies lower in the vertical direction than the outer end regions thereof.

5. A trailer coupling according to claim 1, wherein the lower supporting structure runs approximately arcuately between the outer end regions.

6. A trailer coupling according to claim 1, wherein the lower supporting structure, starting from the outer end regions thereof, runs elongated in the direction of its central region.

7. A trailer coupling according to claim 1, wherein the tensile stiff rigid supporting structure is formed as a planar supporting structure, which runs transversely to the vertical direction.

8. A trailer coupling according to claim 1, wherein the tensile stiff supporting structure extends in a plane running approximately parallel to the horizontal longitudinal direction.

9. A trailer coupling according to claim 8, wherein the plane encloses an angle of at most ±40° with the horizontal longitudinal direction.

10. A trailer coupling according to claim 1, wherein the upper supporting structure, the primarily torsionally rigid supporting structure and the lower supporting structure is the primarily tensile stiff supporting structure.

11. A trailer coupling according to claim 1, wherein the bearing unit is connected both to the upper supporting structure and the lower supporting structure.

12. A trailer coupling according to claim 1, wherein the bearing unit is arranged between the supporting structures.

13. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the upper supporting structure runs approximately arcuately between the outer end regions thereof.

14. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the torsionally rigid supporting structure is tubular at least in sections.

15. A trailer coupling according to claim 14, wherein the torsionally rigid supporting structure is tubular over its entire length.

16. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the tensile stiff supporting structure, at the outer end regions, has a greater areal extent in a horizontal longitudinal direction than in the central region.

17. A trailer coupling according to claim 16, wherein the tensile stiff supporting structure, starting from the outer end regions and extending increasingly in the direction of the central region, has a decreasing extent in the horizontal longitudinal direction.

18. A trailer coupling according to claim 16, wherein the tensile stiff supporting structure has the maximum extent in the direction parallel to the horizontal longitudinal direction in the region of a connection to the mounting elements.

19. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the tensile stiff supporting structure has two structure arms running between the end regions and the central region, which structure arms are connected to one another at least in the central region.

20. A trailer coupling comprising a cross member unit, which is mountable on a tail region of a vehicle body, and which extends transverse to a longitudinal direction of the vehicle body of a passenger vehicle, and a bearing unit held by the cross member unit, by means of which bearing unit a ball neck with a coupling ball is held on the cross member unit, wherein the cross member unit is connected in its two outer, mutually opposed end regions to mounting elements by means of which the cross member unit is fixed to the tail region, the cross member unit has an upper supporting structure as considered in the vertical direction and a lower supporting structure arranged lower down than the upper supporting structure in the vertical direction, in that the supporting structures are each connected at their mutually opposed outer end regions to the mounting elements and in a central region carry the bearing unit, in that one of the supporting structures is formed as a supporting structure that is primarily torsionally rigid and at least partially surrounds a structure interior, and in that the other of the supporting structures is formed as a supporting structure that is primarily tensile stiff in the direction of travel, wherein the bearing unit is held on a mounting unit connected to the supporting structures.

21. A trailer coupling according to claim 20, wherein the mounting unit extends between the tensile stiff supporting structure and the torsionally rigid supporting structure and is fixedly connected to the central regions both of the tensile stiff supporting structure and of the torsionally rigid supporting structure.

* * * * *